May 7, 1968 S. W. LEVINE 3,382,318
VARIABLE-RATIO COPY-REPRODUCING MACHINE
Filed Feb. 8, 1965
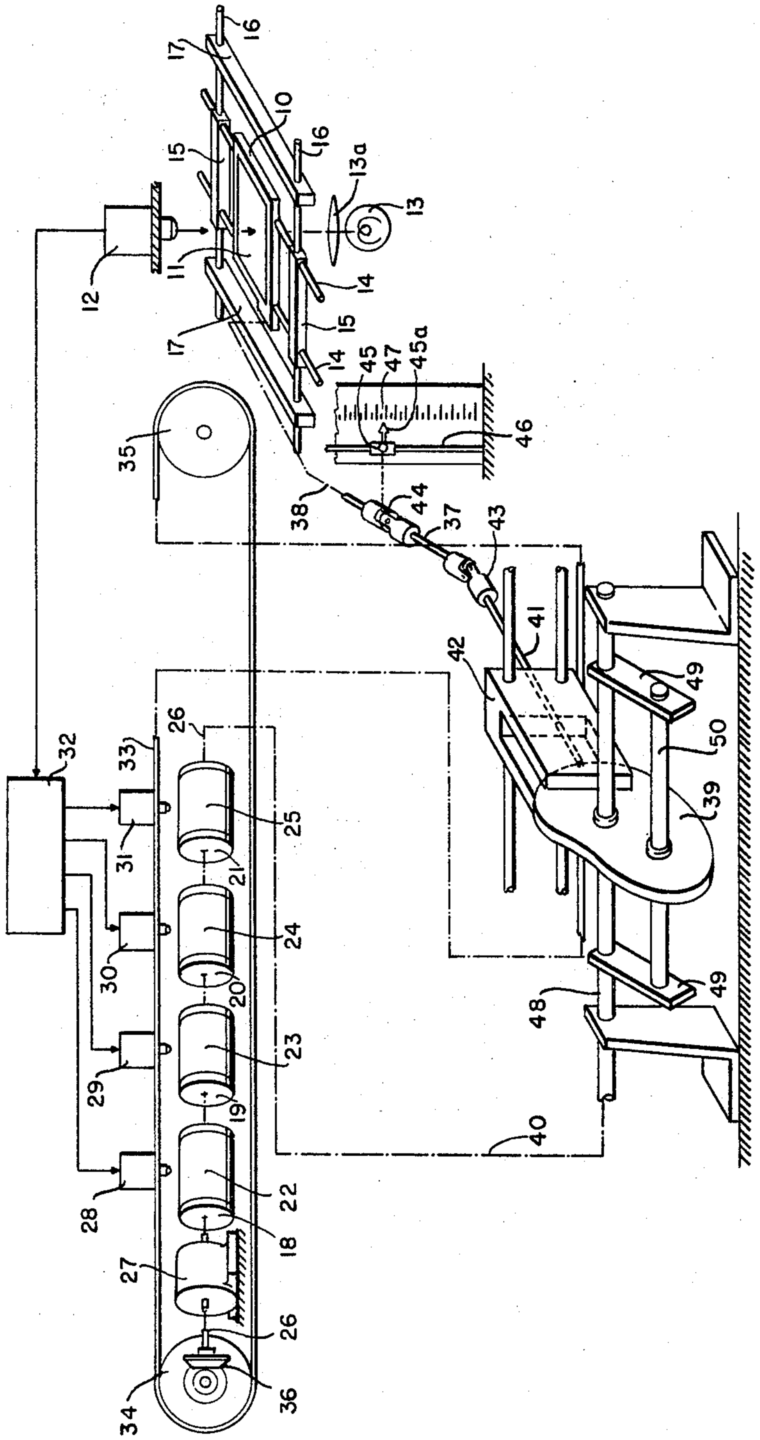

United States Patent Office 3,382,318
Patented May 7, 1968

3,382,318
VARIABLE-RATIO COPY-REPRODUCING MACHINE

Samuel W. Levine, Westbury, N.Y., assignor to Fairchild Camera and Instrument Corporation, a corporation of Delaware Filed Feb. 8, 1965, Ser. No. 430,897
7 Claims. (Cl. 178—6.6)

This invention relates to variable-ratio copy-reproducing scanners and, while it is of general application, it is particularly adaptable to scanners for preparing multiple color separations simultaneously from an original color copy and will be described in such an application.

In the preparation of color-separation negatives or plates from an original color copy, it is frequently desirable that the color separations be enlarged or reduced with respect to the original copy, while retaining the same aspect ratio. It is also desirable to be able to adjust the degree of enlargement or reduction continuously, rather than in discrete steps, so that the color-separation negatives or plates may be of any desired size. This is particularly true when it is desired to reproduce only a limited selected area of a larger original copy.

In scanners in which both the copy holder and the image-sheet holders are planar, that is, the so-called "flat-bed" apparatus, enlargement and reduction in two dimensions have been effected by two independent mechanisms, necessarily accurately proportioned so as to maintain a constant aspect ratio. This mechanism has been complex and costly, for example, such as the mechanism shown in Patent No. 2,086,798 to Greenberg.

However, in scanners in which either the copy holder or the image-sheet holder is cylindrical and is scanned by rotation of the cylinder and by axial movement of a scanning element, enlargement or reduction has been obtained only in discrete steps, as by replacing a cylinder wtih another of a different diameter and by changing the gear ratio between the drive of one of the scanning elements. Making such changes is not only cumbersome and time-consuming but limits enlargement or reduction to a relatively few discrete size ratios; that is, it is not capable of continuous adjustment over a range of size ratios.

It is an object of the invention, therefore, to provide a new and improved variable-ratio copy-reproducing scanner which obviates the above-noted limitations on prior art scanners of this type.

It is another object of the invention to provide a new and improved variable-ratio copy-reproducing scanner by means of which the ratio of the size of the scanned copy to that of the scanned image sheet may be adjusted continuously over a wide range.

It is a further object of the invention to provide a new and improved variable-ratio copy-reproducing scanner suitable for application not only to flat bed machines but to hybrid machines including a copy holder and one or more image-sheet holders, one of which is planar and the other of which is cylindrical.

In accordance with the invention, there is provided a variable-ratio copy-reproducing scanner comprising a first holder for a copy to be reproduced, a photoelectric pickup device, and first means for scanning a copy on the first holder with the pickup device in a first direction to form a line and in a second direction to form a series of lines. The scanner further comprises a second holder for an image sheet. a transducer coupled to the pickup device for acting on an image sheet on the second holder, second means for scanning an image sheet on the second holder with the transducer in a first direction to form a line and in a second direction to form a series of lines, one of the first and second holders being planar, and a single ratio arm interconnecting the first and second scanning means for effecting scanning of the planar holder in response to and in synchronism with the scanning of the other of the holders and having an adjustable intermediate universal support for adjusting the relative sizes of the scanning patterns on the holders. The phrases "scanning a copy with a pickup device" or "scanning an image sheet with a transducer," as used herein and in the appended claims, refer to the production of relative motion between the respective elements, either or both of which may be movable. Further, the phrase "a series of lines," as used herein and in the appended claims, refers to a series of rectilinear lines, in the case of a planar or flat bed apparatus, or a series of helical lines in the case of an apparatus with cylindrical copy or image-sheet supports. The term "universal support" is used herein and in the appended claims to describe a support of an element movable angularly in any plane through a pivot point. The term "synchronism" is used herein and in the appended claims to denote a predetermined time relationship between two or more movable elements and does not imply that these elements necessarily move at the same velocity.

For a better understanding of the present invention, together with other and further objects thereof, reference is had to the following description, taken in connection with the accompanying drawings, while its scope will be pointed out in the appended claims.

Referring to the drawings:

The single figure is a perspective view, partly schematic, of a variable-ratio copy-reproducing scanner embodying the invention.

Referring now more particularly to the drawing, there is represented a variable-ratio copy-reproducing scanner including a planar first holder 10 for a copy 11 to be reproduced. Associated with the holder 10 and fixedly supported on a frame (not shown) is a photoelectric pickup device 12 which may be of conventional type. In the event the copy 11 is transparent, it is adapted to be illuminated by a light source 13 on the opposite side of the copy from the pickup device 12, via a condenser lens **13*a*. It will be understood that in case the copy 11 is opaque, it will be illuminated from the same side as the pickup 12. The apparatus further includes means for scanning the copy 11 on the holder 10 with the pickup device 12 in a first direction to form a line and in a second direction to form a series of lines. To this end, the holder 10 is arranged to slide on guide rods 14, 14, in turn mounted in a frame including elements 15, 15 disposed to slide transversely on guide rods 16, 16, in turn rigidly secured in frame members 17, 17**.

The scanner of the invention further includes a plurality of holders 18, 19, 20, and 21 on which are mounted image sheets 22, 23, 24, and 25, respectively. The holders 18–21, inclusive are mounted on a common shaft 26 connected to be driven by a motor 27. The scanner further comprises a plurality of transducers 28, 29, 30, and 31 disposed to act individually on the image sheets 22–25, respectively, and coupled to the pickup device 12 through a suitable amplifier 32. The transducers 28–31, inclusive, may be either modulated light sources, in case the image sheets 22–25, inclusive, are photographic films, or they may be cutter heads, in case the image sheets 22–25, inclusive, are image plates to be engraved.

The scanner of the invention further includes means for scanning the image sheets 22–25, inclusive, on their respective holders 18–21, inclusive, with their respective transducers 28–31, inclusive, in synchronism with the scanning of the copy 11 by the pickup device 12, that is, in a first direction to form a line on each of the image sheets and in a second direction to form a series of lines. This scanning means comprises an endless inelastic belt, such as a steel tape 33, mounted on spaced pulleys 34 and 35, the pulley 34 being connected to be driven by the motor 27 through a speed-reduction gearing 36.

As shown, the original copy 11 and its holder 10 are planar and are movable relative to the fixed scanning pickup device 12 in two orthogonal directions in its plane. The copy holder 10 is driven from the means for scanning the image sheets 22–25, inclusive, by means of a single ratio arm 37 interconnecting the two scanning means for effecting scanning of the planar holder 10 in response to, and in synchronism with, the scanning of the image sheets 22–25, inclusive, on the holders 18–21, inclusive, respectively. Specifically, one end of the ratio arm 37 is connected by a linkage, shown schematically at 38, to the holder 10 and there is provided a motion-translating mechanism including an element, such as a cam 39, rotated in synchronism with the rotational movement of the cylindrical holders 18–21, inclusive, and movable axially in synchronism with the axial movement of the transducers 28–31, inclusive. Specifically, the cam 39 is mounted on a continuation of the shaft 26, as represented schematically at 40. The cam 39 has a predetermined substantially linear rise and a relatively rapid fall for effecting a gradual linear scan of the copy 11 and a rapid retrace, as described hereinafter. The cam 39 is engaged by a cam-follower rod 41 longitudinally slidable in a yoke member 42 and connected to the other end of the ratio arm 37 through a universal coupling 43. The ratio arm 37 is universally supported in a knuckle 44 which is longitudinally adjustable along the arm 37 and which may be secured in any desired position by means of a clamp 45 sliding on and adjustably secured to a rod 46. The clamp 45 may carry an indicator 45*a* and an associated scale 47 for indicating the size ratio of the scanning pattern of the copy 11 and that of each of the image sheets 22–25, inclusive.

The cam 39 is axially slidable on its shaft 48 but is driven with the shaft by means of a yoke comprising arms 49, 49 and an interconnecting drive rod 50. The yoke 42 is driven axially along the shaft 48 in synchronism with the movement of the transducers 28–31, inclusive. This synchronism may be achieved by any conventional electrical or mechanical arrangement linking the yoke 42 and the transducers 28–31, inclusive. By way of example, the yoke 42 may be secured directly to the tape 33, as indicated.

It is believed that the operation of the scanner of the invention will be apparent from the foregoing description. In brief, it will be assumed that an original copy 11 is mounted on the holder 10 and image sheets 22–25, inclusive, are mounted on the holders 18–21, inclusive, respectively, and that the clamp mechanism 44, 45 is adjusted to the mid-point of the ratio arm 37. Rotation of the shaft 26 and concurrent lateral movement of the transducers 28–31, inclusive, will produce a helical scanning line on each of the image sheets 22–25, inclusive, and, concurrently, rotation of the shaft 48 and the linear rise cam 39 will produce an equal linear movement of the holder 10 along the guide rods 14, 14. While the transducers 28–31, inclusive, scan the dead spaces of their respective image sheets 22–25, inclusive, that is, the areas in which these sheets are clamped on their respective holders, the cam 39 produces a fast retrace motion, returning the holder 10 to its initial position, and this process is repeated.

Concurrently, the transverse movement of the transducers 28–31, inclusive, by the tape 33 effects a corresponding transverse movement of the yoke 42, the cam 39, and the cam-follower 41 and, through the ratio arm 37, imparts an equal transverse movement of the holder 10 via the frame members 15, 15 along the guide rods 16, 16.

If, now, it is desired to produce scanning patterns on the image sheets 22–25, inclusive, of a size different from that scanned on the copy 11 but with the same aspect ratio, the clamp mechanism 44, 45 is adjusted along the ratio arm 37 and secured in position. The result is that the movements of the holder 10 in both orthogonal directions are increased or decreased proportionately and the size ratio of the scanning pattern on the copy 11 and image sheets 22–25, inclusive, is adjusted correspondingly. In this way, by proper adjustment of the clamp mechanism 44, 45, any desired size ratio, either enlarging or reducing, may be readily obtained.

While there has been described what is, at present, considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A variable-ratio copy-reproducing scanner comprising:
- a first holder for a copy to be reproduced;
- a photoelectric pickup device;
- first means for scanning a copy on said holder with said device in a first direction to form a line and in a second direction to form a series of lines;
- a second holder for an image sheet;
- a transducer coupled to said pickup device for acting on an image sheet on said second holder;
- second means for scanning an image sheet on said second holder with said transducer in a first direction to form a line and in a second direction to form a series of lines;
- one of said holders being planar;
- and a single ratio arm interconnecting said first and second scanning means for effecting scanning of said planar holder in response to and in synchronism with the scanning of the other of said holders and having an adjustable intermediate universal support for adjusting the relative sizes of the scanning patterns of said holders.

2. A variable-ratio copy-reproducing scanner comprising:
- a planar first holder for a copy to be reproduced;
- a photoelectric pickup device;
- first means for scanning a copy on said holder with said device in a first direction to form a line and in a second direction to form a series of lines;
- a cylindrical second holder for an image sheet;
- a transducer coupled to said pickup device for acting on an image sheet on said second holder;
- second means for scanning an image sheet on said second holder with said transducer in a first direction to form a line and in a second direction to form a series of lines;
- and a single ratio arm interconnecting said first and second scanning means for effecting scanning of said planar holder in response to and in synchronism with the scanning of said cylindrical holder and having an adjustable intermediate universal support for adjusting the relative sizes of the scanning patterns of said holders.

3. A variable-ratio copy-reproducing scanner comprising:
- a first holder for a copy to be reproduced;
- a photoelectric pickup device;
- first means for scanning a copy on said holder with said device in a first direction to form a line and in a second direction to form a series of lines;
- a plurality of image-sheet holders;
- a plurality of transducers coupled to said pickup device and disposed individually to act on said image-sheet holders;
- second means for scanning image sheets on their holders with their respective transducers in synchronism in a first direction to form a line and in a second direction to form a series of lines;

one of said copy holders and image-sheet holders being planar;

and a single ratio arm interconnecting said first and second scanning means for effecting scanning of said planar holder in response to and in synchronism with the scanning of the other of said holders and having an adjustable intermediate universal support for adjusting the relative sizes of the scanning patterns of said holders.

4. A variable-ratio copy-reproducing scanner comprising:

a first holder for a copy to be reproduced;

a photoelectric pickup device;

first means for scanning a copy on said holder with said device in a first direction to form a line and in a second direction to form a series of lines;

a second holder for an image sheet;

a transducer coupled to said pickup device for acting on an image sheet on said second holder;

second means for scanning an image sheet on said second holder with said transducer in a first direction to form a line and in a second direction to form a series of lines;

one of said holders being planar and movable relative to its scanning element in two orthogonal directions in its plane;

the other of said holders being cylindrical and movable relative to its scanning element axially and peripherally;

and a single ratio arm interconnecting said first and second scanning means for effecting scanning of said planar holder in response to and in synchronism with the scanning of the other of said holders and having an adjustable intermediate universal support for adjusting the relative sizes of the scanning patterns of said holders.

5. A variable-ratio copy-reproducing scanner comprising:

a first holder for a copy to be reproduced;

a photoelectric pickup device;

first means for scanning a copy on said holder with said device in a first direction to form a line and in a second direction to form a series of lines;

a second holder for an image sheet;

a transducer coupled to said pickup device for acting on an image sheet on said second holder;

second means for scanning an image sheet on said second holder with said transducer in a first direction to form a line and in a second direction to form a series of lines;

one of said holders being planar and movable relative to its scanning element in two orthogonal directions in its plane;

the other of said holders being cylindrical and movable relative to its scanning element axially and peripherally;

a single ratio arm having an adjustable intermediate universal support;

one end of said arm being connected to said scanning means of said planar holder;

and a motion translating mechanism including an element rotated in synchronism with the rotational movement of said cylindrical holder and movable axially in synchronism with axial scanning thereof and connected to the other end of said arm for adjusting the relative sizes of the scanning patterns of said holders.

6. A variable-ratio mechanism for driving a first scanner having scanning movements in orthogonal directions in a common plane from a second scanner having axial and rotational scanning movements comprising:

a ratio arm, one end adapted to be connected to said first scanner and having a longitudinally adjustable intermediate universal support;

a cam rotated in synchronism with rotational movement of said second scanner and movable axially in synchronism with axial movement thereof;

and a cam-follower engaging said cam and adapted to be connected to the other end of said ratio arm.

7. A variable-ratio mechanism for driving a first scanner having scanning movements in orthogonal directions in a common plane from a second scanner having axial and rotational scanning movements comprising:

a ratio arm, one end adapted to be connected to said first scanner and having a longitudinally adjustable intermediate universal support;

a cam rotated in synchronism with rotational movement of said second scanner and movable axially in synchronism with axial movement thereof;

and a cam-follower engaging said cam and adapted to be connected to the other end of said ratio arm;

said cam having a predetermined substantially linear rise and a relatively rapid fall, effecting a gradual linear scan and rapid retrace of said first scanner.

References Cited

UNITED STATES PATENTS

| | | | |
|---|---|---|---|
| 2,544,225 | 3/1951 | Hearle | 178—6.6 |
| 2,976,355 | 3/1961 | Levine | 178—6.6 |

ROBERT L. GRIFFIN, *Primary Examiner.*

H. W. BRITTON, *Assistant Examiner.*